US007158445B2

(12) United States Patent
Behn et al.

(10) Patent No.: US 7,158,445 B2
(45) Date of Patent: Jan. 2, 2007

(54) APPARATUS AND METHOD FOR SEISMIC DATA ACQUISITION

(75) Inventors: Lawrence P. Behn, Houston, TX (US); John Chester, Katy, TX (US); Leo Dekkers, Houston, TX (US); John Downey, Houston, TX (US); Keith Elder, Richmond, TX (US); Jerry Iseli, Allen, TX (US)

(73) Assignee: Input/Output, Inc., Stafford, TX (US)

( * ) Notice: Subject to any disclaimer, the term of this patent is extended or adjusted under 35 U.S.C. 154(b) by 0 days.

(21) Appl. No.: 11/037,542

(22) Filed: Jan. 18, 2005

(65) Prior Publication Data

US 2005/0196985 A1 Sep. 8, 2005

(51) Int. Cl.
*G01V 1/00* (2006.01)
*H01R 9/03* (2006.01)

(52) U.S. Cl. .................. 367/76; 439/620; 439/624; 439/638

(58) Field of Classification Search .................. 367/20, 367/76, 153, 154; 439/620, 624, 606, 638
See application file for complete search history.

(56) References Cited

U.S. PATENT DOCUMENTS

| 2,590,531 | A |   | 3/1952  | McLoad ............... 177/352 |
| 4,117,448 | A |   | 9/1978  | Stiems ............. 340/15.5 TS |
| 4,360,729 | A | * | 11/1982 | Harvey et al. ............. 367/76 |
| 4,445,741 | A |   | 5/1984  | Annoot ................. 339/49 R |
| 4,526,430 | A |   | 7/1985  | Williams .............. 339/45 M |
| 4,917,632 | A |   | 4/1990  | Smith .................... 439/624 |
| 5,627,798 | A | * | 5/1997  | Siems et al. ............... 367/76 |
| 5,628,655 | A |   | 5/1997  | Chamberlain ............ 439/651 |
| 2003/0057769 | A1 | * | 3/2003 | Scott ........................ 307/9.1 |

FOREIGN PATENT DOCUMENTS

| EP | 0 050 560 | | 4/1982 |
| EP | 0 372 908 | | 6/1990 |
| FR | 2 551 221 | | 3/1985 |
| WO | WO 85/01360 | * | 3/1985 |
| WO | WO 98/12577 | | 3/1998 |
| WO | WO 98/14800 | * | 4/1998 |
| WO | WO 98/34448 | | 8/1998 |
| WO | WO20039610 A1 | * | 7/2000 |

* cited by examiner

*Primary Examiner*—Ian J. Lobo
(74) *Attorney, Agent, or Firm*—Madan, Mossman & Sriram, P.C.

(57) ABSTRACT

A seismic data acquisition system includes a connector housing and a mating electrical circuitry module. A single interface couples electrical circuitry housed in the electrical circuitry module to one or more signal data carriers that are consolidated at a single location in the connector housing. Preferably, the connector housing and electrical circuitry module each have a substantially contaminant-free interior regardless of whether these two parts are mated. An alternate connector housing has two plug casings, each of which are provided with a plug. A complementary alternate electrical circuitry module includes two receptacles complementary to the plugs and an interior space for holding the electrical circuitry. A locking pin disposed within the plug casing selectively engages the electrical circuitry module. A method for establishing communication between electrical circuitry and the carriers and external devices includes providing a single communication interface between the carrier and the electrical circuitry.

38 Claims, 12 Drawing Sheets

APPARATUS AND METHOD FOR SEISMIC DATA ACQUISITION

BACKGROUND OF THE INVENTION

1. Field of the Invention

This invention relates generally geologic surveys and more particularly to an apparatus and method for acquiring and processing seismic data.

2. Description of the Related Art

Seismic exploration is used to determine the presence of subsurface structures in earth formations that may contain useful materials such as hydrocarbons. A conventional system for conducting seismic survey operations includes acoustic sources, transducers, seismic cables, and a data collection facility. The acoustic source is used to insonify a subterranean formation. The acoustic energy transmitted by the acoustic source radiates generally downwardly into the earth and is partially reflected back towards the earth's surface by subsurface acoustic impedance boundaries, called reflectors, which may exist within the earth. The transducers, which are positioned at or near the earth's surface, are used to detect this reflected acoustic energy. The transducers generate electrical signals proportional to the magnitude of the acoustic energy detected. The seismic cables, which are in communication with the transducers, transmit the electrical signals to the data collection facility for processing.

A conventional survey usually requires the deployment of thousands of transducers and, thus, significant lengths of seismic cables. These seismic cables are formed of cable segments that are joined by connectors. The connectors enable the transmission of data between successive cable segments and, thus, play an integral role in transmitting signals from the transducers to the data collection facility. The connectors can also be adapted to distribute power to the transducers and transmit instructions from the data collection facility to the transducers. Moreover, connectors provided with processors can be configured to convert the analog signals from a transducer into a digital signal. Exemplary seismic survey equipment and arrangements are discussed in U.S. Pat. No. 5,627,798, which is hereby incorporated by reference for all purposes.

Conventional connectors typically have a housing that includes two external electrical plugs that couple to seismic cables. The housing can include a seal that protects the contents of the housing, such as electrical circuitry, from exposure to the environment and means to transfer tension loading from the cable to the housing without subjecting the electrical connectors to this tension.

One conventional connector is disclosed in POT Application No. WO 00/39610, titled "Improved System of Acquiring Geophysical Data" published Jun. 6, 2000 (hereafter the "'610 PCT App."). The '610 PCT App. describes a box including two cables each having end pieces, first and second electrical plugs, first and second platens, and a cover. Each end piece has a flattened portion. The end pieces are aligned in an opposing fashion such that the flattened portions present a co-planar surface on which the cover mounts. The first platen is disposed within the cover and superposed on the flattened portions. The second platen is fixed on the first platen and supports signal processing equipment. Electrical communication is established between the signal processing equipment and first and second cables via first and second electrical plugs, respectively. Additionally, an O-ring is provided between the cover and connector to seal the box.

It will be appreciated that this conventional connector exemplifies a number of drawbacks. First, this connector requires two electrical plugs. The use of two plugs can necessitate additional fabrication time and increases the number of points of potential failure in the connector. Second, the signal processing equipment is not provided a sealed environment until the cover is secured on the cable ends, i.e., the connector is fully assembled. Thus, field repair or disassembly/assembly of this conventional connector requires unsealing the box and leaving the signal processing equipment exposed to the damaging effects of the elements. Third, the electronics package/processing circuitry cannot be removed from this conventional connector without disassembling the cable string. Thus, the task of changing out only the electronics package inconveniently requires disassembly of the entire box and disconnecting the seismic cables. Fourth, because the electronics package cannot be removed, the electronics package cannot be redeployed in a different location while, for example, the cable is serviced. Thus, this conventional connector increases the number of electronics packages that must be carried in inventory to efficiently carry out survey operations.

Still another drawback is that conventional connectors do not permit the mechanized deployment and retrieval of extended lengths of the cables. Mechanized deployment and retrieval systems typically have opposing tires that draw cable from a drum and spool up cable onto a drum or into a storage container. The opposing tires frictionally engage the cables such that rotation of the tires moves the cables in a desired direction. Unfortunately, some conventional connectors are not configured to pass through these opposing tires because the arrangement of cable and the take-out terminals on conventional connectors are not compact. Rather, such conventional connectors are bulky and include protrusions having angles, which may jam into the tires. Moreover, some conventional connectors have a body length that prevents these connectors from lying flat on the arcuate surface of a drum.

The present invention addresses these and other limitations of conventional connectors.

SUMMARY OF THE INVENTION

The present invention relates to a seismic data acquisition system that minimizes deployment costs and provides enhanced protection electrical components. The system includes a data acquisition unit utilized in a seismic array made up of seismic data carriers (e.g., cables) and transducers. The system can utilize analog signals, digital signals or a combination of both. For example, the transducers may transmit analog signals that are converted to digital signals at one or more of the data acquisition units. Alternatively, a processor positioned proximate to the transducer can perform the conversion and transmit a digital signal to the data acquisition unit.

The data acquisition unit includes a connector housing and a mating electrical circuitry module. The electrical circuitry module houses electrical circuitry whereas the connector housing consolidates at a single location the seismic data carrier to be in communication with the electrical circuitry. A single interface or connector couples the cable to the electrical circuitry. Preferably, the connector housing and electrical circuitry module are provided with independent seals such that a contaminant-proof barrier is maintained in the connector housing and electrical circuitry module whether or not these two parts are mated. Further, the connector housing incorporates an anchor for the wiring associated with the cables such that tension in the cable is transferred into the connector housing without loading the single connector.

An alternate data acquisition unit also includes a connector housing and a mating electrical circuitry module. The alternate connector housing has two plug casings, each of which is provided with a plug. The alternate unit includes two receptacles complementary to the plugs and an interior space adapted to hold the electrical circuitry. Preferably, the electrical circuitry module is provided with seals such that a contaminant-proof barrier is maintained in the electrical circuitry module whether or not the connector housing is mated to the electrical circuitry module. The plug casings are secured to the electrical circuitry module with fasteners. Alternatively, a locking pin disposed within the plug casing can be used to selectively engage the electrical circuitry module. Rotation of the locking pin brings a finger formed on the locking pin to move in and out of locking engagement with a surface on the electrical circuitry module.

As can be seen, the data acquisition unit is simple, rugged, and compatible with mechanized cable deployment and retrieval systems.

The present invention also provides methods that establish electrical communication between electrical circuitry and the cables and transducers making up a seismic array. A method includes providing a single electrical interface through which a cable communicates with the electrical circuitry. This method can also include preventing contaminants from contacting the electrical circuitry.

Thus, the present invention comprises a combination of features and advantages that enable it to overcome the deficiencies of prior systems and methods. The various characteristics described above, as well as other features, will be readily apparent to those skilled in the art upon reading the following detailed description of the embodiments of the invention, and by referring to the accompanying drawings.

It should be understood that examples of the more important features of the invention have been summarized rather broadly in order that detailed description thereof that follows may be better understood, and in order that the contributions to the art may be appreciated. There are, of course, additional features of the invention that will be described hereinafter and which will form the subject of the claims appended hereto.

DESCRIPTION OF THE FIGURES

For a detailed description of an embodiment of the invention, reference will now be made to the accompanying drawings wherein.

DETAILED DESCRIPTION OF THE INVENTION

Figure 1:
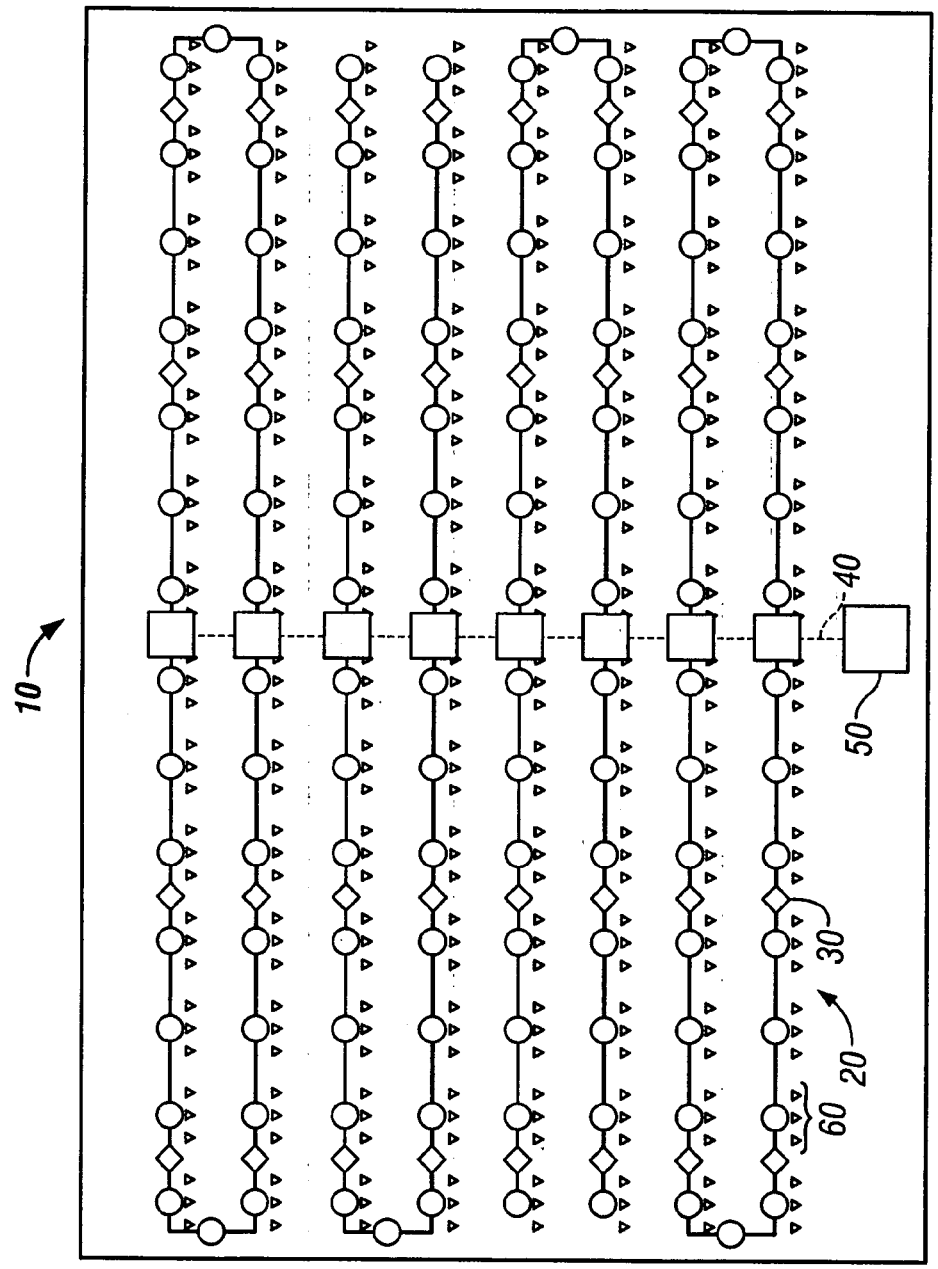
FIG. 1 schematically illustrates an embodiment of a seismic survey array made in accordance with the present invention.

The present invention relates to devices and methods providing rugged and cost-effective interface for seismic signal data carriers. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein.

Figure 2A:
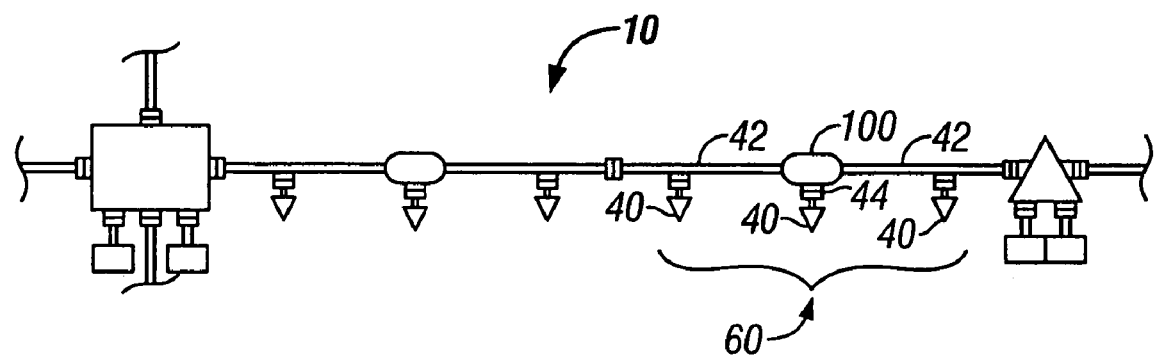
FIG. 2A schematically illustrates a portion of the FIG. 1 seismic survey array that incorporates an embodiment of a seismic data acquisition system made in accordance with the present invention wherein a seismic data acquisition unit made in accordance with the present invention performs analog to digital processing.

The teachings of the present invention can be advantageously applied to nearly any situation that requires the transmission of analog and/or digital signals through reliable and robust interfaces. For simplicity, the embodiments of the present invention will be described in the context of systems and equipment suited for performing seismic surveys. Referring initially to FIG. 1, there is diagrammatically shown a seismic survey system 10 made in accordance with the present invention. The seismic survey system 10 includes physical data carriers such as seismic cables generally referred to with numeral 20, battery booster units 30, cross-line units 40, and a data collection facility 50. In other embodiments, the data carrier can utilize wave transmissions. These components and equipment are known in the art and will not be discussed in detail. Referring now to FIG. 2A, the seismic survey system 10 also includes a seismic data acquisition system 60 that is provided with one or more transducers 40, data carriers such as cross-line cables 42, and a data acquisition unit 100. The transducer 40 can be any device that converts acoustic energy into signals representative of the detected energy. Exemplary transducers 40 include, but are not limited to, geophones, hydrophones, one-axis accelerometers, and multi-axis accelerometers. The seismic data acquisition unit 100 facilitates the transmission of data and/or power between the transducers 40 and other system 10 components. The signal transmission media for data and/or power exchange is preferably one or more seismic signal data carriers. As noted above, other transmission media, such as RF transmitters, may be used in certain applications.

The data acquisition system 60 may be configured to collect and process data of various parameters of interest and transmit this data with analog signals, digital signals, or a combination of these signals. For example, referring still to FIG. 2A, the data acquisition system 60 may be configured such that the transducers 40 transmit an analog signal via the cross-line cables 42 or take out cable 44 to the data acquisition unit 100. The unit 100 can include a processor that converts the analog signal transmitted by the transducers 40 into digital signals for processing and re-transmission.

Figure 2B:
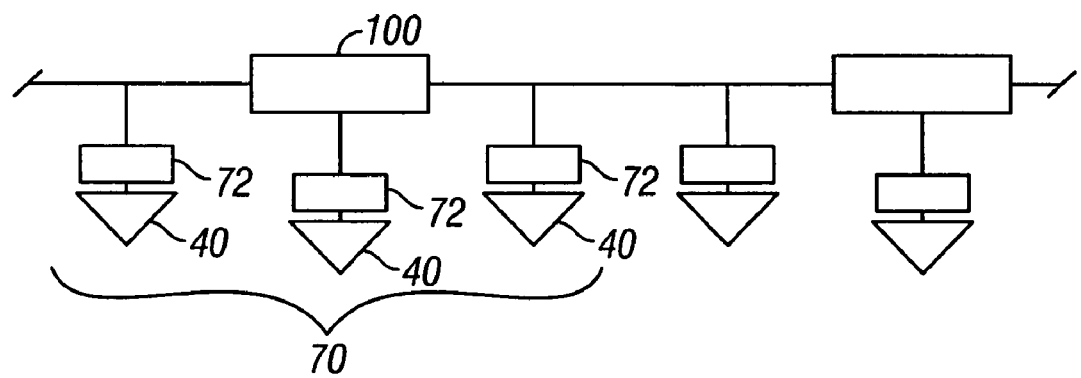
FIG. 2B schematically illustrates a seismic survey array made in accordance with the present invention wherein a digitizer positioned proximate to a transducer transmits digital signals to an embodiment of a seismic data acquisition unit made in accordance with the present invention.

Referring now to FIG. 2B, there is shown an alternate system 70 wherein an analog-to-digital converter 72 is positioned proximate to the transducer 40. For example, the converter 72 may be integrated into the transducer 40 or be a stand-alone unit interposed between the transducer 40 and the data acquisition unit 100. By digitizing the seismic data early in the transmission, the system 70, including the data acquisition unit 100, can be configured to process and transmit data in primarily a digital format.

Figure 3A:
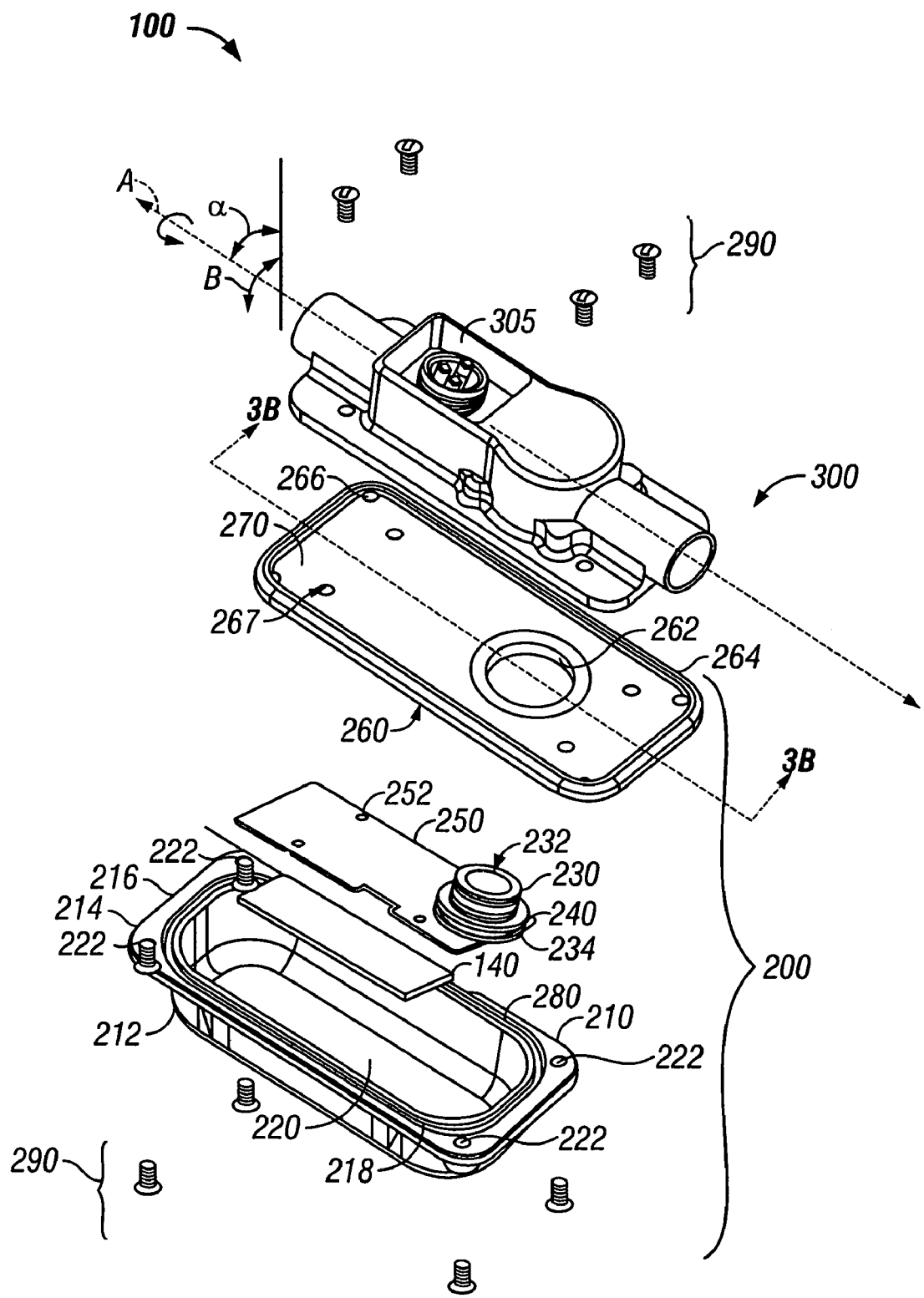
FIG. 3A illustrates an isometric exploded view of an embodiment of a seismic data acquisition unit made in accordance with the present invention.

Referring now to FIG. 3A, the seismic data acquisition unit 100, an embodiment of which is described below, cooperates with the seismic data acquisition system, the exemplary embodiments of which have been discussed above, to collect, process and transmit seismic data and power. An exemplary unit 100 includes electric circuitry 140, an electric circuitry module 200, and a connector housing 300.

The electric circuitry 140 includes processing software and hardware that can receive, process, transmit seismic data and can communicate with other externally coupled devices. By "coupled," it is meant that an exchange or transfer of data/power is enabled by a physical connection (electrical or optical wires and connectors) or non-physical connection (e.g., inductive, RF, acoustic). The electric circuitry 140 can include analog-to-digital converters coupled to input from each transducer 40 associated with the seismic data acquisition system 100. The circuitry 100 further includes one or more buffers or memory for storing digitized signals transmitted from other devices such as seismic data acquisition units and signals from the analog-to digital circuit. The circuitry 140 further includes one or more transceivers that transmit at a predetermined data rate digital signals from the buffers and the analog-to-digital converters to other devices such as seismic data acquisitions or a control unit connected to the seismic data unit 100. A transceiver in the seismic acquisition unit 100 receives control or command signals from a control unit and retransmits such control signals to other devices such as seismic data acquisition units coupled to the unit 100. The transceiver may comprise optical telemetry transceivers. One or more central processing units performs data manipulation operations on seismic data from detectors and controls the operations of other components in the circuitry 140 according to programmed instructions on models stored in the circuitry 140 and/or at a remote location. As explained above, the circuitry 140 may also be adapted to operate in a fully digital environment wherein the circuitry 140 receives digital signal input from one or more transducer lines. Further, the circuitry 140 may be adapted to distinguish between different data types and selectively receive and process such data.

Referring still to FIG. 3A, a preferred electric circuitry module 200 provides the electric circuitry 140 with a sealed environment that is kept substantially free of contaminants such as dirt or moisture. This sealed environment exists whether or not the electric circuitry module 200 is secured to the connector housing 300. When the connector housing 300 is mated with the electric circuitry module 200, a single interface for communication is established between circuitry 140 and the signal data carriers at the connector housing 300. In a preferred embodiment the interface is formed of electrical components. The preferred electric circuitry module 200 includes a casing 210, a receptacle 230, a receptacle seal 240, a support board 250, a lid 260, a lid seal 280, and fasteners 290.

The casing 210 includes a shell 212, a flange 214, and a groove 216. The shell 212 is a generally oblong structure having a rim 218 and an interior space 220 configured to accept the electric circuitry 140. In order to maintain a generally compact configuration for the unit 100, the shell 212 is no larger than that required to accommodate electric circuit 140 in the interior space 220. The flange 214 is formed along the shell rim 218 and acts as a seating surface for the lid 260. The flange 214 includes holes 222 that are disposed on the outer corners of the casing 210. The holes 222 are adapted to receive fasteners 290 that secure the lid 260 against the flange 212 and the casing 210. The groove 216 is formed generally contiguously along the shell rim 218 and is adapted to receive the lid seal 280. The lid seal 280, when compressed between the flange 214 and the lid 260, provides a barrier against the intrusion of contaminants such as moisture and dirt into the interior space 220. The interior space 220 is preferably filled with a foam-like material (not shown) in which the electric circuitry 140 is suspended and protected from shock and vibrations.

Figure 3B:
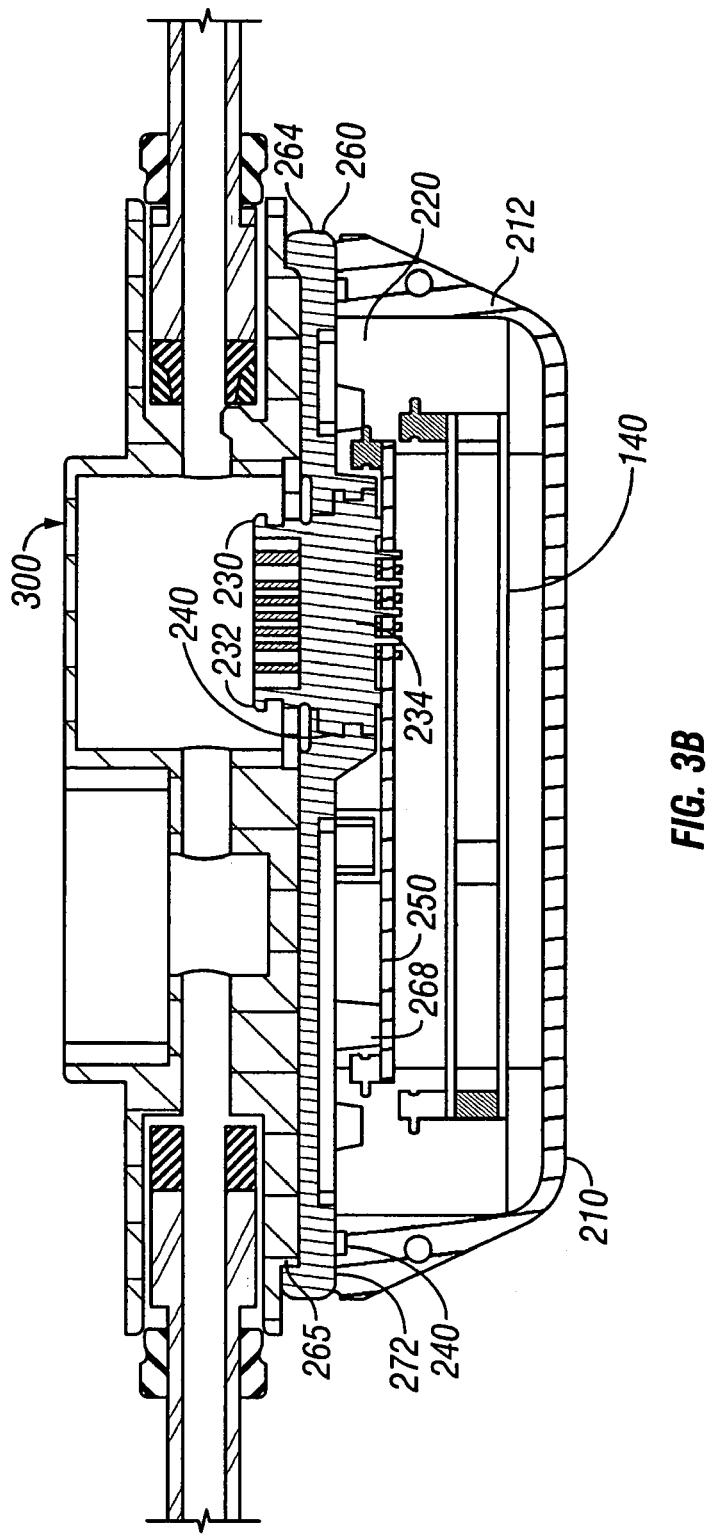
FIG. 3B illustrates a cross-sectional side view of the FIG. 3A embodiment of the present invention in an assembled state.

Referring now to FIGS. 3A and 3B, the lid 260 operates as a removable closure for the casing 210. The lid 260 is a generally planar member having an opening 262, a lip 264, a first set of holes 266, a second set of holes 267, a first set of posts 268, an upper surface 270 and a lower surface 272. The opening 262 provides access to the interior space 220 and is formed complementary to the receptacle 230. The seal 240, such as a radial o-ring, is radially disposed about the receptacle 230 and thereby provides a barrier against the intrusion of contaminants such as moisture and dirt into the housing interior space 220.

The lip 264 distributes the clamping force of the fasteners 290 generally evenly along the lid seal 280. The lip 264 is formed as a raised shoulder formed along the perimeter of the lid 260. Further, the lip 264 may be configured to provide an abutting surface 265 within which the connector housing 300 seats. The abutting surface 265 prevents the connector housing 300 from sliding relative to the lid upper surface 270 during assembly of seismic data acquisition unit 100.

Referring now to FIG. 3A, the fasteners 290 secure the lid 260 onto the casing 210. The fasteners 290 extend through the holes 222 of the flange 214 and the first set of internally threaded holes 266. Alternatively, the first set of holes 266 may be provided with internal threads that are complementary to the fasteners 290. Preferably, the holes 222 and 266 should be arrayed so as to promote a distributed clamping force on the lid seal 280 when the fasteners 290 are tightened. The holes 267 are blind internally threaded holes adapted to engage the fasteners 290 that secure the connector housing 300 to the lid 260. It should be understood that the fasteners 290 and associated holes 222 and 266 are merely one of several arrangements that may be used to secure the lid 260 against the casing 210. Such variations will be apparent to one of ordinary skill in the art.

The receptacle 230 presents the single communication interface between the electric circuitry 140 and the connector housing 300. The receptacle 230 may be a conventional electrical connector having a male, female or any other interface that is suited to enable data exchange and/or power transmission. For example, the interface can be adapted to use known transmission media such as RF, optical, acoustic, electromagnetic, and induction. Thus, the receptacle 230 can use either a physical signal transmission medium (e.g., copper wire or fiber optical wire) or energy waves. The receptacle 230 includes a reduced diameter connection end 232 that protrudes through the lid opening 262 and a base 234 that is configured to electrically couple with the support board 250. The receptacle seal 240 is radially disposed about the base 234 and thereby prevents contaminants from entering the housing interior space 220 through the opening 262. When the connector housing 300 is removed from the casing 210, a plastic cap or other sealing member (not shown) may be fitted onto connection end 232 to protect the receptacle 230. In other embodiments, the receptacle 230 is not fixed onto the circuitry module 200 but either "floats" in a foam or is fixed to the electric circuitry 140. In such embodiments, the lid can be omitted.

The support board 250 provides a mounting platform for the receptacle 230. The support board 250 may be a known printed circuit board or similar structure. The support board 250 includes thru-holes 252 and a wiring interface configured to mate with the receptacle 230. Preferably, the support board 250 is fixed to the lower surface 272 of the lid 260. For example, fasteners (not shown) fitted through the holes 252 can mate with internally threaded holes (not shown) formed into the first set of posts 268 of the lid 260. The electric circuitry 140 is connected to the support board 250 by known electrical wiring such as ribbon wires.

From the above, it can be seen that the electric circuitry module 200 is a portable, reliable and rugged casing for transporting and housing the electric circuitry 140. For example, the electric circuitry module 200 may be detached from the connector housing 300 and carried to a service facility for repair without exposing the electric circuitry 140 to contaminants. Moreover, the use of a single receptacle simplifies initial assembly and facilitates trouble-shooting for defective parts. Furthermore, the electric circuitry module 200 minimizes the need for multiple and expensive electrical connectors by consolidating electrical wiring at a single receptacle.

Figure 4A:
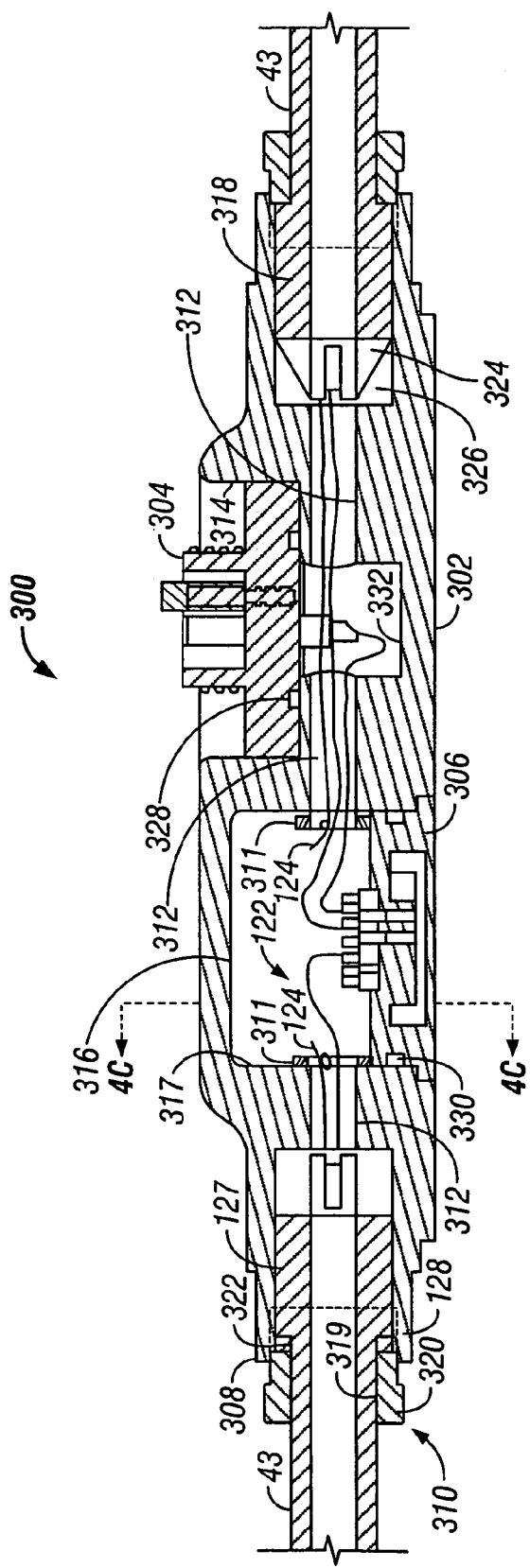
FIG. 4A illustrates a cross-sectional side view of an enclosure shown in the FIG. 3A embodiment of the present invention.
Figure 4B:
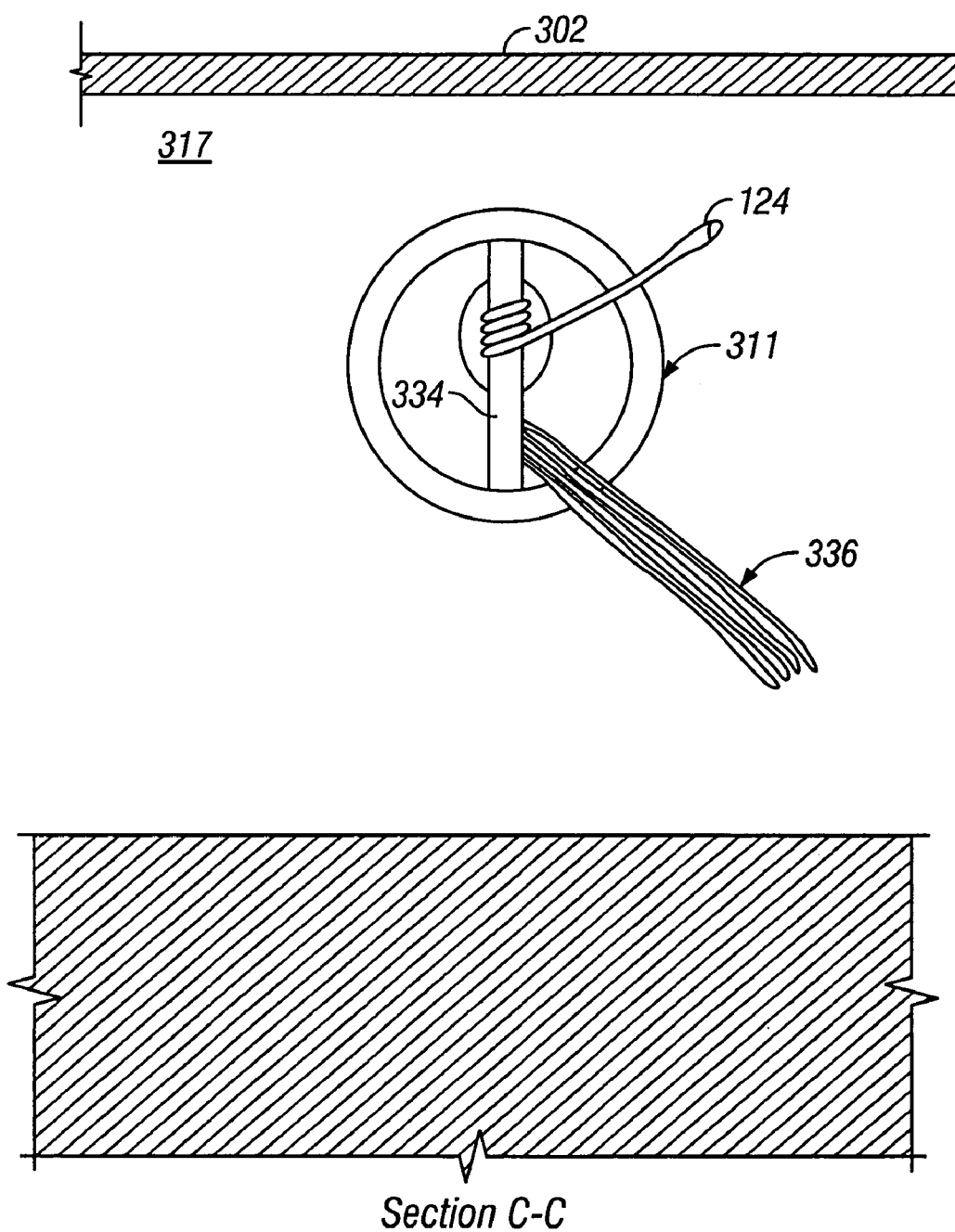
FIG. 4B illustrates a cross-sectional side view of an enclosure utilizing an exemplary support made in accordance with the present invention.

Referring now to FIG. 4A, the connector housing 300 collects the various communication and/or power carriers or lines from transducers, neighboring seismic data acquisition units, and other equipment and consolidates the carriers at a single interface. Where an electrical interface is used, a preferred connector housing 300 is a structure that includes a body 302, a take-out 304 and a plug 306. For example, the connector housing 300 is generally unitary and may be fabricated through known processes such as molding, stereolithography, welding, or machining.

The body 302 includes barrels 308, a clamp 310, an anchor 311, a conduit 312, a first cavity 314, and a second cavity 316. The barrels 308 are cylindrical protuberances extending from the body 302. The barrels 308 are preferably arranged in an opposing fashion on the body 302 such that the cables and data carriers 42 are axially aligned. Other alignments, however, may be suitable. It can be seen that such an arrangement will facilitate the laying or retrieval of an extended lengths of the cables 42 that incorporate the unit 100. The barrels 308 have inlets 318 adapted to receive cable ends 43. A portion of the inlets 318 includes internal threads 319. The clamp 310 captures the cable ends 43 within the barrel 308. The clamp 310 uses a gland seal-type arrangement that includes a compression nut 320, a washer 322, a collet 324, and a spacer 326. The external threads of the clamp 310 engage the internal threads 319 formed within the inlet 318. When threaded into inlet 318, the clamp 310 urges the washer 322 into abutting engagement with an annular step 128 of a cable handle 127. The relatively soft cable handle 127 deforms under compression and seals inlet 318. At the same time, the cable handle 127 drives the collet 324 into the spacer 326. The collet 324 applies a clamping force on cable end 43 when so driven. Thus, it should be appreciated that the clamp 310 provides a sealed termination between the body 302 and cable 42 at the barrel 308. It should also be appreciated that cable end 43 may be disconnected from the body 302 by simply removing the compression nut 320. Thus, the clamp 310 provides a reusable securing mechanism. Alternatively, cable ends 43 may be secured within the barrels 308 with an over mold or overmolding (not shown) formed at least partially of a plastic such as polyurethane. This overmolding encapsulates the barrel 308 and a portion of the cable 42 extending out of the inlet 318.

The first cavity 314 and the second cavity 316 secure the take-out 304 and the plug 306, respectively, within the body 302. The take-out 304 and the plug 306 may be fixed within their respective cavities 314, 316 by means of fasteners (not shown) that extend through holes in flanges (not shown) provided on the take-out 304 and the plug 306. Seals 328 and 330 are fitted onto the take-out 304 and the plug 306, respectively. Tightening of the fasteners (not shown) causes seals 328 and 330 to be compressed between the body 302 and the take-out 304 and the plug 306, respectively. Thus, first and second cavities 314 and 316 are sealed so that contaminants cannot enter the interior of the body 302.

The first cavity 314 includes a wire well 332 that is a relatively smaller cavity adapted to store a portion of the wiring extending from the take-out 304. The second cavity 316 provides a collection point for the various wires entering the body 302 and is defined by an inner wall 317. The conduit 312 provides communication between the first cavity 314, the second cavity 316 and the inlets 318. The conduit 312 is composed of one or more channels formed within the body 302. Thus, the wires of the cables 42 travel from the inlets 318 through the conduit 312 to the second cavity 316. Similarly, the wires connected to the take-out 304 extend from the first cavity 314 through the conduit 312 to the second cavity 316.

Referring now to FIGS. 4A and B, the anchors 311 transfer tension or tractive force from the cables 42 to inner wall 317, and ultimately to the body 302, without loading the connection between the wiring 336 and the plug 306. The anchor 311 is substantially rigid body that engages the body 302 and provides an attachment surface for a tension member 124. In one embodiment, an O-shaped member, such as a washer, has a center bar 334. The wiring 336 extending out of the cable end 43 terminates at the plug 306. A tension member (e.g., KEVLAR® core or similar material) 124 of the cable 42 wraps around the center bar 334 but does not connect to the plug 306. Glue, such as an epoxy resin, is applied to the wrappings of the tension member 124, thereby securing the wrappings to the center bar 334 of the anchor 311. The anchors 311 are positioned adjacent the inner wall 317. Thus, a tension loading applied to cable 42 will be transferred to the body 302 via the tension member 124 wrapped around the center bar 334 of the anchor 311. In another embodiment, the anchor 311 may be a potted cup, disk or cylindrical member that is disposed within conduit 312 adjacent to inner wall 317. The potted cup includes a wire channel and a tapered tension member channel. The wiring 336 passes through the wire channel and connects with the plug 306 (FIG. 4A). The tension member 124 passes through the tension member channel and attached to the potted cup, the inner wall 317, or other convenient structure. The attachment may be accomplished by known mechanical devices or a chemical adhesive such as a cyanoacrylate compound. In either case, because of the anchoring effect of the anchor 311 against inner wall 317, the span of the wiring between the anchor 311 and the plug 306 remains generally slack. Thus, only minimal, if any, loading is imposed on the plug 306. Under normal conditions, the anchor 311 is held against the inner wall 317 by the pre-tension in the tension member 124.

The plug 306 presents a single interface for the one or more cables and/or take-out consolidated at connector housing 300. The plug 306 may be a conventional electrical connector that has a male, female or any other interface that is suited to enable data exchange and/or power transmission. The plug 306 is a known electrical connector that is complementary to receptacle 230. It should be appreciated that plug 306 and receptacle 230 are only one of many types of electrical connections that are available to establish communication between electrical circuitry 140 and the other equipment and cables used to perform the seismic activity. Accordingly, other non-electrical interfaces (e.g., electromagnetic, induction, RF, optical, acoustic) may be used with equal effectiveness depending on the particular type of telemetry system used. In certain embodiments, the plug 306 is loosely disposed rather than fixed in the connector housing 300.

Referring now to FIG. 3A, the take-out 304 is an connection point that enables communication with an externally connected device such as the transducer 40. The take-out 304 is adapted to exchange data and/or transmit electrical power and is available from known manufacturers in any number of configurations. As discussed above, other interfaces suited to enable data exchange and/or power transmission can also be used. Generally speaking, the take-out 304 may be considered as having a face 305. The face 305 represents the physical orientation of the take-out 304 with respect to the connector housing 300. The take-out face 305 may be positioned at any angle α from the axis A of the cable 42. Furthermore, the take-out face 305 may be rotated any angle β about axis A. It is preferred, however, that the take-out 304 remain generally grouped with the terminations for the cables 42 so as to maintain a compact profile for the seismic data acquisition unit 100.

Figure 5A:
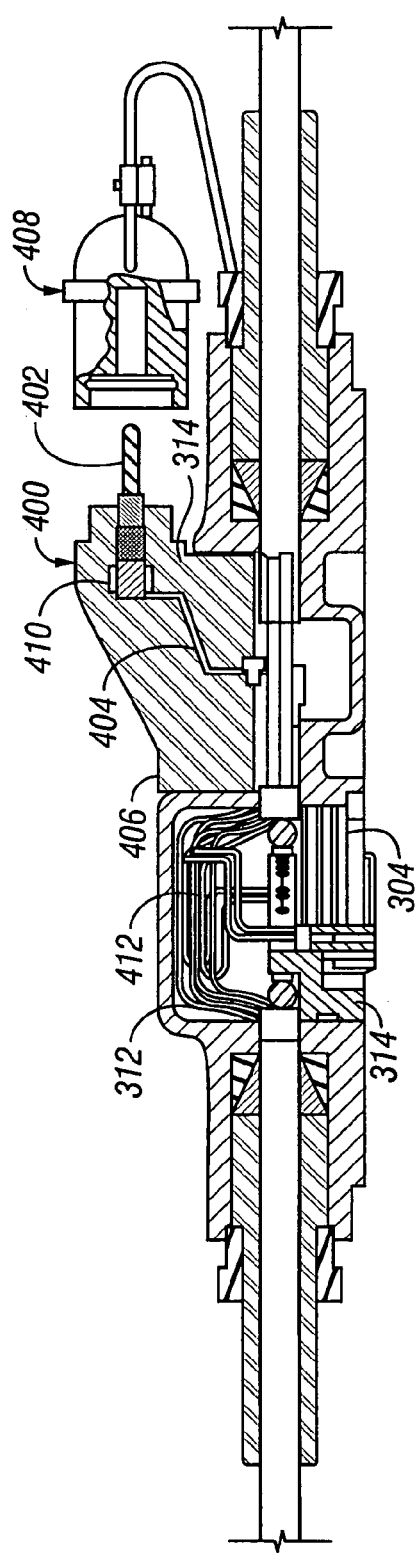
FIG. 5A illustrates a cross-sectional side view of an alternate take-out arrangement wherein the take-out includes a banana-type plug.

Referring now to FIG. 5A, there is shown another take-out terminal arrangement 400. The take-out terminal arrangement 400 includes a terminal 402, wiring 404, overmolding 406 and an optional cap 408. The terminal 402 is a banana plug-type interface that accepts a complementary connection from the wiring associated with a transducer (not shown). The wiring 404 has a first end 410 connected to the terminal 402 and a second end 412 that connects with the plug 304. The overmolding 406 encases portions of the terminal 402 and the wiring 404 in a molded block that is shaped complementary the first cavity 314. O-rings and other sealing members may be used as needed to provide a sealed termination at the first cavity.

Figure 5B:
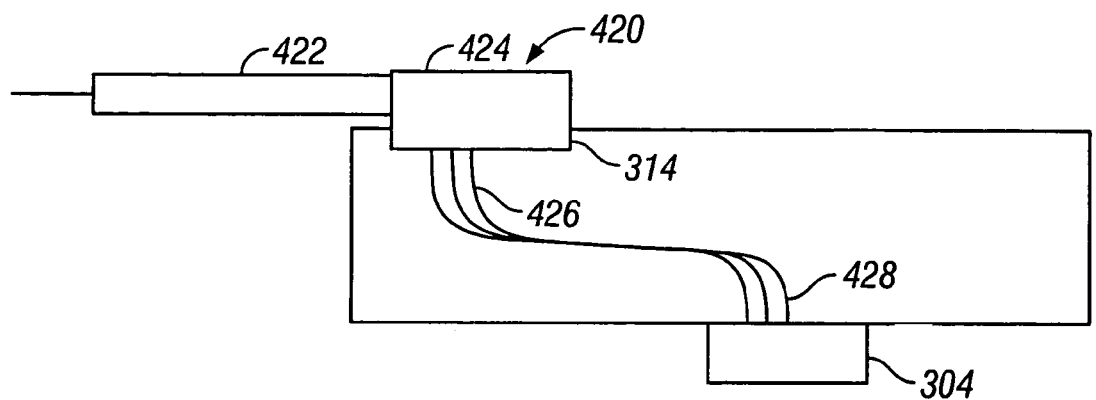
FIG. 5B illustrates a cross-sectional side view of another alternate take-out arrangement wherein the take-out includes an overmolded pig-tail.

Referring now to FIG. 5B, there is diagrammatically shown another take-out terminal arrangement 420. The take-out terminal arrangement 420 includes a pig-tail 422, overmolding 424 and wiring 426. The wiring 426 at one end connects, either directly or indirectly, to a transducer 40 (FIG. 2) and at the other end 428 connects with the plug 304. The overmolding 424 encases at least a portion of the pig-tail 422 in a molded block that is shaped complementary the first cavity 314. The take-out terminal arrangement 420 may use fasteners or other devices (e.g., clips) or a quick disconnect mechanism (not shown) to secure the pig-tail 422 within the first cavity 314. O-rings and other sealing members (not shown) may be used as needed to provide a sealed termination at the first cavity 314.

Figure 5C:
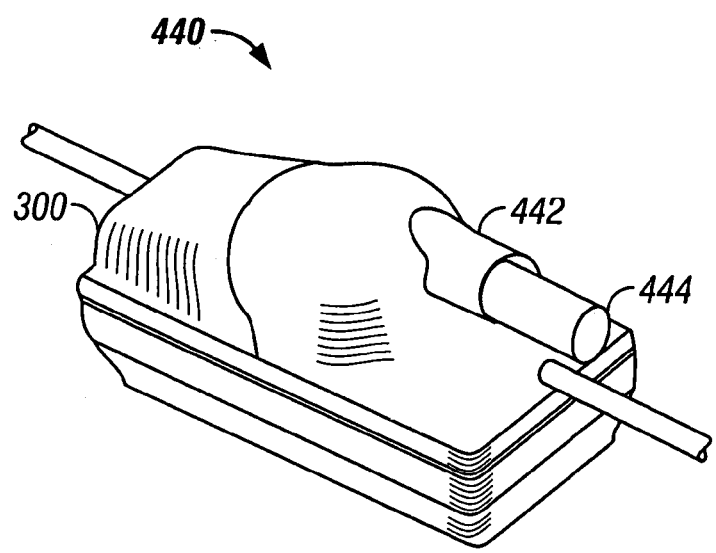
FIG. 5C illustrates an isometric view of still another alternate take-out arrangement wherein the take-out is substantially integrally molded onto the enclosure.

Referring now to FIG. 5C, there is diagrammatically shown another take-out terminal arrangement 440. The take-out terminal arrangement 440 includes overmolding 442 that encapsulates a take-out 444. The take-out 444 connects to a transducer 40 (FIG. 2) at one end and connects with the plug 304 (FIG. 3) at the other end. The overmolding 442 encases the wiring associated with the take-out in a molded block that effectively renders the wiring an integral component of the housing connector 300 (FIG. 3). Alternatively, a commercially available take-out connector (not shown) may be mated with connector housing 300 and an overmolding formed thereon.

From the above, it can be seen that data acquisition unit 100 provides a compact design having independently sealed components. For example, it will be appreciated that the use of a single connector interface provides a compact design and facilitates the mechanized deployment and retrieval of the cables utilizing the unit 100. For example, the relatively short length of the unit 100 enables the unit 100 to lay flat on the arcuate surface of a drum. Moreover, the width and thickness of the unit 100 can be generally accommodated within the rotating tires or wheels of mechanized deployment and retrieval systems, such as a squirter.

It should be understood that the above-described features of seismic data acquisition unit 100 are subject to numerous adaptations and variations. For example, certain elements are described as having separate parts but such elements may be formed as one integral element. Other elements may have interchangeable substitutes. For example, lock rings, glue, and clamping mechanisms may be used instead of threaded fasteners. Further, one or more of the fasteners described may be replaced with a quick-disconnect mechanism as discussed below or other similar arrangements.

Figure 6:
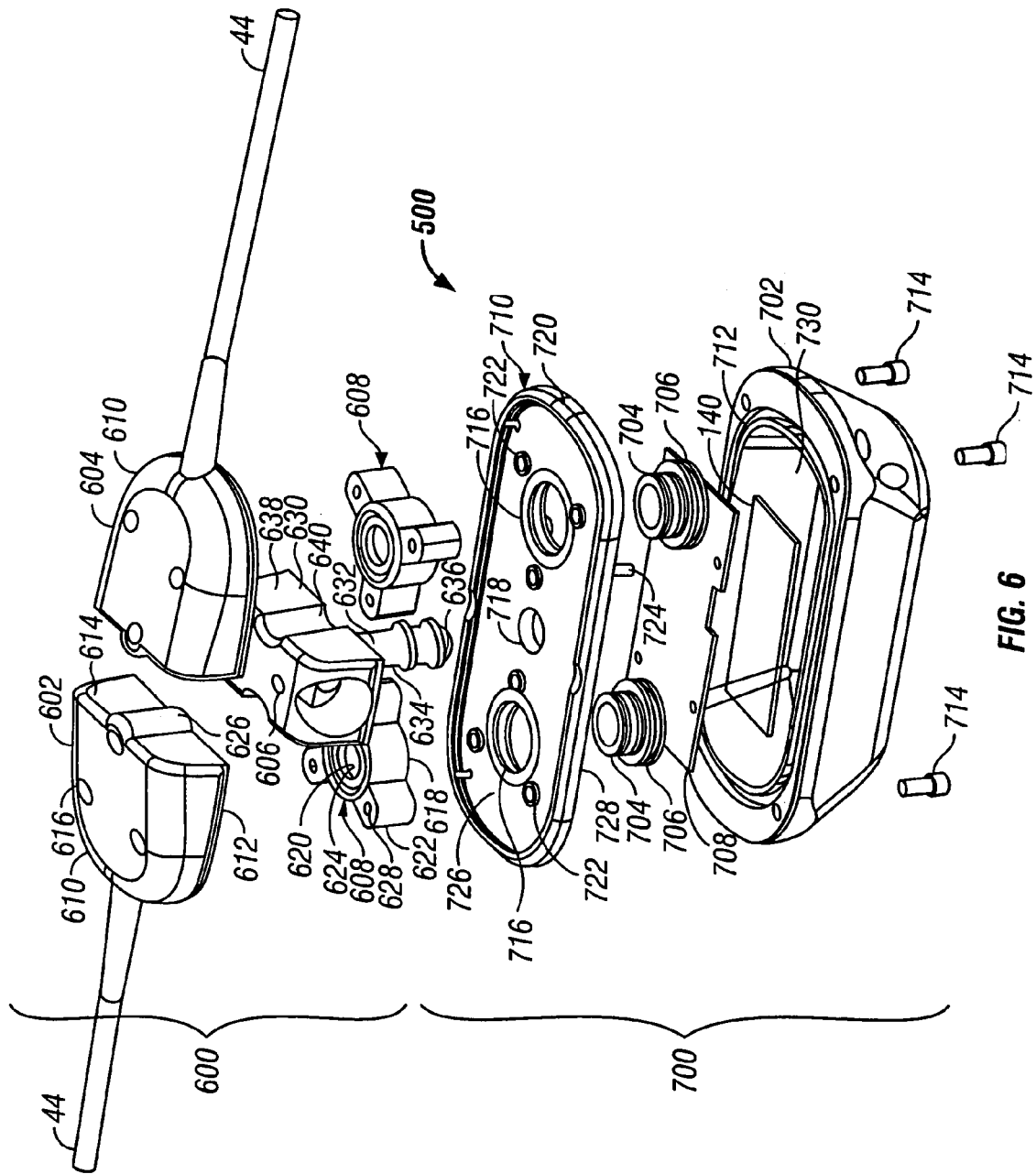
FIG. 6 illustrates an isometric exploded view of an alternate embodiment of a seismic data acquisition unit made in accordance with the present invention.

Referring now to FIG. 6, there is shown an alternate embodiment of a seismic data acquisition system. Alternate seismic data acquisition unit 500 includes an enclosure 600 and an electrical circuitry module 700 and is also used in conjunction with the cables 44 and the electric circuitry 140. As will be seen, the alternate unit 500 provides selective connecting/disconnecting for the cables 42 and also seals the electric circuitry 140 in a self-contained and detachable compartment.

The enclosure 600 provides separate termination points for the various seismic data carriers that are intended to be in communication with the electric circuitry 140. The enclosure 600 has first and second plug casings 602,604 and a take-out casing 606.

The plug casings 602,604 each include a plug 608, wiring (not shown), and an overmolding 610. Because the plug casings 602 and 604 are substantially identical, the following description will only make reference to the plug casing 602 with the understanding that the description equally applies to the casing 604. The wiring (not shown) associated with the plug casing 602 extends from the cables 42 and terminates at the plug 608. The overmolding 610 provides a sealed and resilient covering for the plug casing 602 by encapsulating portions of the plug 608, the wiring (not shown) and cable 42 in a block of polymer such as polyurethane. The overmolding 610 includes a cavity (not shown), a bottom face 612, an inner face 614 and holes 616. The plug 608 is disposed within the cavity and includes a hub 618, an electrical connector 620, and a plurality of ears 622. The hub 618 has a central passage 624 in which the electrical connector 620 is fixed. The portion of electrical connector 620 adapted to mate with electrical circuitry module 700 protrudes from the bottom face 612. The remainder of electrical connector 620, however, is sealed within the overmolding 610. The hub ears 622 are semi-cylindrical supports that radiate outwardly from the hub 618. One ear 622 is oriented such that a tongue 626 is formed along the inner face 614. Each ear 622 is provided with a passage 628 in axial alignment with an overmolding hole 616. The plug casing 602 is secured to electrical circuitry module 700 by fasteners (not shown) that extend through each hole 616 and associated passage 628 and engage electrical circuitry module 700.

The take-out casing 606 is centrally positioned on electrical circuitry module 700 and provides a connection point between a transducer (not shown) and the electric circuitry 140. The take-out casing 606 includes a housing 630, a column 632, a seal 634, and a snap-ring 636. The housing 630 is adapted to receive the cables and wiring from the transducer. The housing 630 includes opposing outer walls 638 that abut the inner faces 614 of the plug casing overmolding 610 and also includes a passage (not shown) adapted to receive the wiring. Each outer wall 638 has a groove 640 that is complementary to the tongue 626. The tongue 626 and groove 640 cooperate to properly align the plug casings 602, 604 and take out casing 606. The column 632 is a cylindrical member formed on the housing 630 that fixes the take-out casing 606 to electrical circuitry module 700. The column 632 includes a bore (not shown) and grooves (not shown) associated with seal 634 and the snap-ring 636. The bore communicates with the housing passage and acts as a conduit through which the wiring passes before entering electrical circuitry module 700.

As generally noted earlier, the take-out plug 606 may be positioned at any angle α from the axis A of cable 42. Furthermore, the take-out plug 606 may be rotated any angle β about axis A. It is preferred, however, that the take-out plug 606 remain generally grouped with the terminations for the cables 42 so as to maintain a compact profile for alternate seismic data acquisition unit 600. Furthermore, the plug casing inner face 614 and outer walls 638 may be arranged to optimize the structural integrity and load bearing characteristics of the plug casing 602,604 and take out casing 606. For example, the inner face 614 can incorporate a negatively sloped surface that induces a clamping force against a positively sloped surface on outer walls 638. For example, outer walls 638 of the take-out casing 606 may be inwardly inclined at an angle of three to five degrees to receive the inner faces 614 having a complementary negative slope, or undercut. In such an arrangement, the take-out casing 606 is captured between the plug casings 602 and 604. The plug casings inner faces 614 and the take-out casing outer walls 638 may also be arranged to incorporate interlocking fingers (not shown) that can transmit a tension from cable 42 (not shown) through the plug casing 602,604 to the take-out casing 606.

The alternate electrical circuitry module 700 mates with the enclosure 600 and provides the electric circuitry 140 with a sealed environment that is substantially free of contaminants such as dirt or moisture. This sealed environment exists whether or not the plug casings 602,604 are secured to the enclosure 600. The alternate electrical circuitry module 700 includes a housing 702, receptacles 704, receptacle seals 706, a support board 708, a lid 710, a lid seal 712 and fasteners 714. The housing 702, the receptacle seals 706, the lid seal 712 and the fasteners 714 are substantially similar to corresponding elements described with respect to the unit 100. Accordingly, descriptions for these and related elements will not be repeated.

The lid 710 operates as a removable closure for the housing 702. The lid 710 is a generally planar member having openings 716, an orifice 718, a plurality of holes 722, posts 724, an upper surface 726, and a lower surface 728. The openings 716 are each configured to receive the receptacle 704. The seal 706, such as a radial O-ring, seals the joint between the opening 716 and the receptacle 704. The holes 722 are arrayed around the openings 716 in a pattern complementary to ear passages 628. Preferably, the holes 722 are blind, i.e., they do not penetrate through the lid 710 in a manner that compromises the sealed nature of electrical circuitry module 700. Internally formed threads (not shown) provided in the holes 722 mate with fasteners (not shown). The orifice 718 provides an access through the lid 710 for the take-out casing 606 and is adapted to closely receive column 632 of the take-out casing 606. Snap ring 636, when installed into a groove (not shown) in column 632, fixes the take-out casing 606 such that the take-out casing housing 630 seats on the lid upper surface 726 and snap ring 636 seats against the lid lower surface 728. Seal 634, when installed into a groove (not shown) in column 632, provides a barrier between column 632 and the lid 710. Thus, it can be seen that the openings 716 and orifice 718 are all provided with seals that provide a barrier against intrusion of contaminants into the housing 702.

Figure 7C:
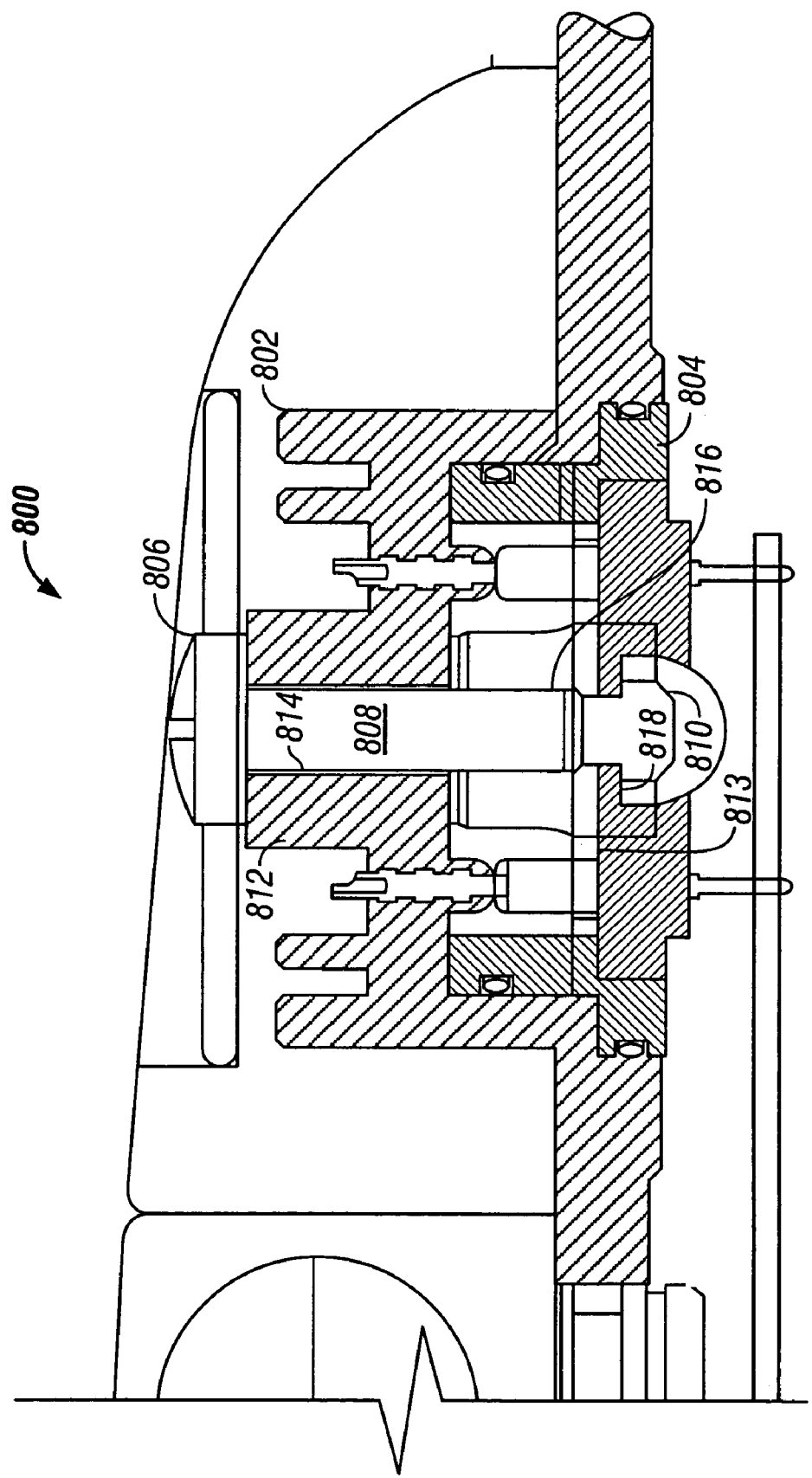
FIG. 7 illustrates a cross-sectional side view of a lock made in accordance with the present invention.

The plug casings 602,604 of the enclosure 600 are fastened to electrical circuitry module 700 by the fasteners (not shown). As noted earlier, the fasteners extend through the passages 628 and the holes 616 and engage the holes 722 in the lid 710. Referring now to FIG. 7, an alternate locking arrangement includes a locking pin 800, alternate plug 802, and an associated receptacle 804. The locking pin 800 includes a head 806, an elongated shank 808, and a finger 810. The finger 810 is a flattened member that protrudes generally perpendicularly from one end of the shank 808. The head 806 is formed on the other end of the shank 808 and has means, such as a bale, that facilitates rotation. Alternate plug 802 includes a top face 812 on which the locking pin head 806 seats and a central passage 814 adapted to receive the shank 808. The finger 810 and a portion of the shank 808 protrude out of the bottom face 813 of the alternate plug 802. The receptacle 804 is provided with a bore 816 and a seat 818. The bore 816 is a generally slotted passage configured to allow insertion and removal of the shank 808 and the finger 810. The seat 818 is a surface formed on the receptacle 804 that receives the finger 810. Thus, under this alternate locking arrangement, the plug casing 602 (or 604) is positioned on the lid 710 such that the plug 802 and the receptacle 804 are generally aligned. Thereafter, the exposed shank 808 and the finger 810 are inserted into the receptacle bore 818 until the finger 810 is generally positioned adjacent to the seat 818. Rotation of the shank 808 brings the finger 810 into engagement with the seat 818. Because the engagement between the finger 810 and the seat 818 prevents axial movement of the shank 808, the locking pin 800 clamps the plug casing 602 against electrical circuitry module 700. It should be appreciated that this alternate locking arrangement facilitates assembly and disassembly. It should also be appreciated that the described alternate locking arrangement may be also adapted to replace one or more of the fasteners described in relation to the above-described embodiments.

Further, one or more housing components may be include a material that exhibits static electricity discharge properties. For example, a conductive material such as aluminum may be used to allow any accumulated static electricity to be discharged into the environment. Also, as an alternative or in combination, a conductive surface treatment may be applied to obtain the desired static electricity dissipation properties for the seismic data acquisition unit.

It will be appreciated that alternate seismic data acquisition unit 600 is compact and amenable to mechanized deployment and retrieval. Further, it can be seen that the casings 602,604,606 each provided with individual connections to electrical circuitry module 700. Thus, for example, field repair or testing may be done on the plug casing 602 without disturbing the connections associated with the plug casing 604 or the take-out casing 606. Furthermore, such work may be accomplished without exposing the electric circuitry 140 to the field environment and its inherent contaminants.

Figure 8A:
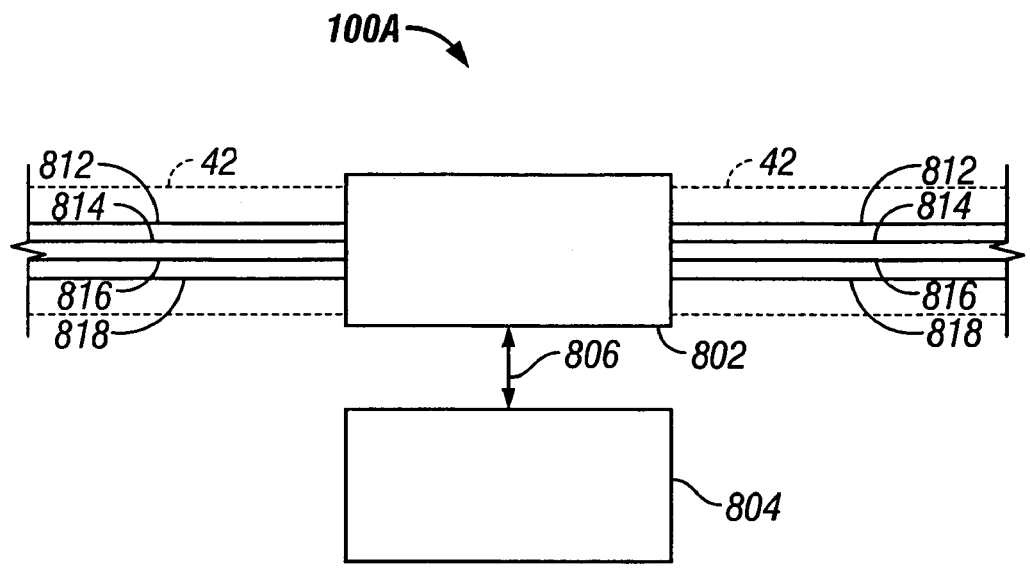
FIG. 8A schematically illustrates an exemplary arrangement for deploying an seismic data acquisition unit made in accordance with the present invention.

The deployment of an exemplary data acquisition unit 100 with now be discussed with reference to FIGS. 8A–C. Referring first to FIG. 8A, there is diagrammatically shown a data acquisition unit 100A operatively connected to a signal/power transmission media 42 (shown in broken lines). The signal/power transmission media 42 can include one or more tension members 812 (assuming a physical media such as wiring is used), one or more seismic signal data transmission (telemetry) lines 814, one or more power transmission lines 816, and one or more transducer lines 818. It should be understood that the term "lines" is used to denote a path for "hard wire" communications and well as transceiver devices for wave transmissions. The lines are shown as separate components merely for convenience. A single line may function, for example, as both the telemetry line and the power line. Such an arrangement is, therefore, within the scope of the present invention. The tension member 812 is typically a KEVLAR® core, or similar material, that is disposed longitudinally along the cables 22. In this embodiment, the connector housing 802 of the unit 100A provides a mechanical and electrical connection between adjacent cables 22. A single interface/connector assembly 806 for establishes power and data transfer between the connector housing 802 and the electric circuitry module 804. The electric circuitry module 804 of the unit 100A can include circuitry that processes the signals received from one or more transducers via wires 818 and transmits such processed signals to other seismic data acquisition units or a control unit connected thereto. The circuitry also receives and retransmits control or command signals sent by a control or a central unit to other seismic data acquisition units via the data transmission lines 814. In this manner the circuitry in each seismic data acquisition unit 100A can process seismic sensor data received from detectors and provide two-way data and signal communication with other serially connected seismic data acquisitions and/or control units.

Figure 8B:
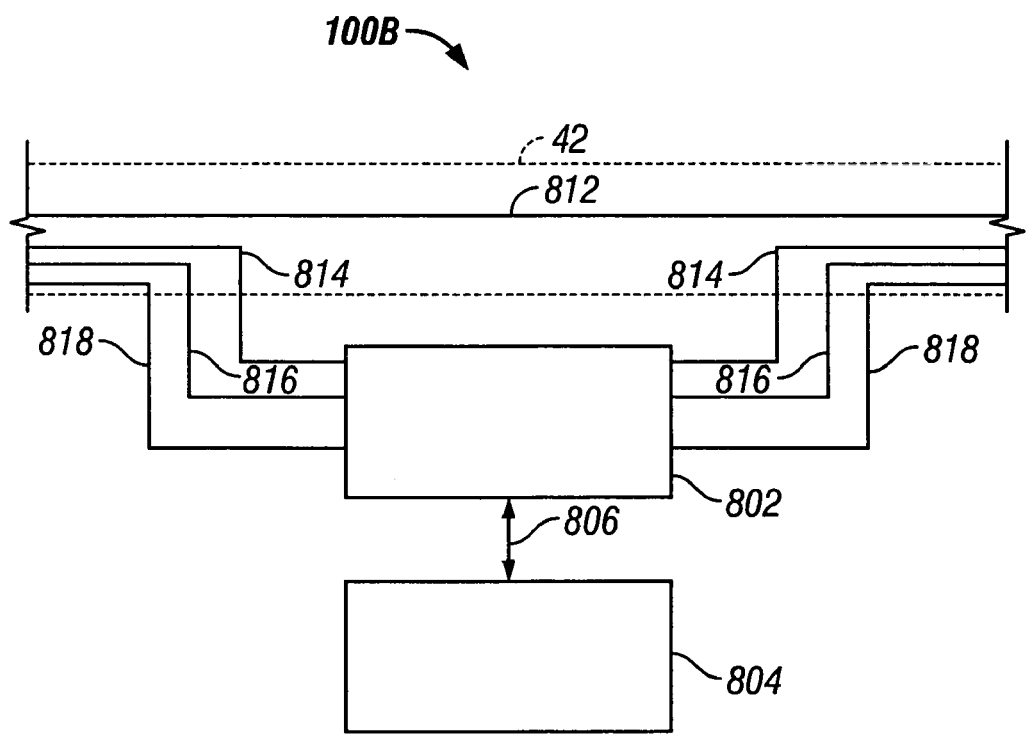
FIG. 8B schematically illustrates an alternate arrangement for deploying a seismic data acquisition unit made in accordance with the present invention onto a continuous portion of a seismic cable.

Referring now to FIG. 8B, there is diagrammatically shown an alternate embodiment of the present invention wherein a seismic data acquisition unit 100B is mounted on a substantially continuous length of a seismic cable 42 (shown in broken lines). The cable 42 can include one or more tension members 812, one or more signal data transmission carriers or lines 814, one or more power transmission lines 816, and one or more transducer lines 818. The tension member 812 remains continuous within the cable 42. In this embodiment, the connector housing 802 of the unit 100B provide the only connection to the cable 42. A single interface assembly 806 establishes power and/or data transfer between the connector housing 802 and the electric circuitry module 804. The single interface assembly 806 can include an electrical assembly (e.g., plug and receptacle) or other forms of signal transfer (RF, optical, acoustic, electromagnetic, induction). Thus, the single interface assembly 806 can use either a physical signal transmission medium (e.g., copper wire or fiber optical wire) or energy waves. Further, the electric circuitry module 804 can be adapted to perform the same functions as described with respect to the electrical circuitry module of the unit 100A. The cable 42 is not cut into two segments and joined via the data acquisition unit 10B. Rather, only the data transmission line 814, a power transmission line 816, and one or more transducer lines 818 are extracted from the cable 42 and connected with the connector housing 802. Because the tension member 812 is not cut, the integrity of the tension member 812 is preserved. The exposed portions of lines 814,816,818 may be protected with known insulation materials. The connector housing 802 may be adapted to mount onto the cable 42 in a split clamp arrangement, a sleeve-like fashion or other suitable arrangement. In other embodiments, the tension member 812 is cut and anchored to the connector housing 802. In these embodiments, it can be seen that the diameter of the data acquisition unit 100B can be reduced to provide the cable 42 with a smoother profile.

Figure 8C:
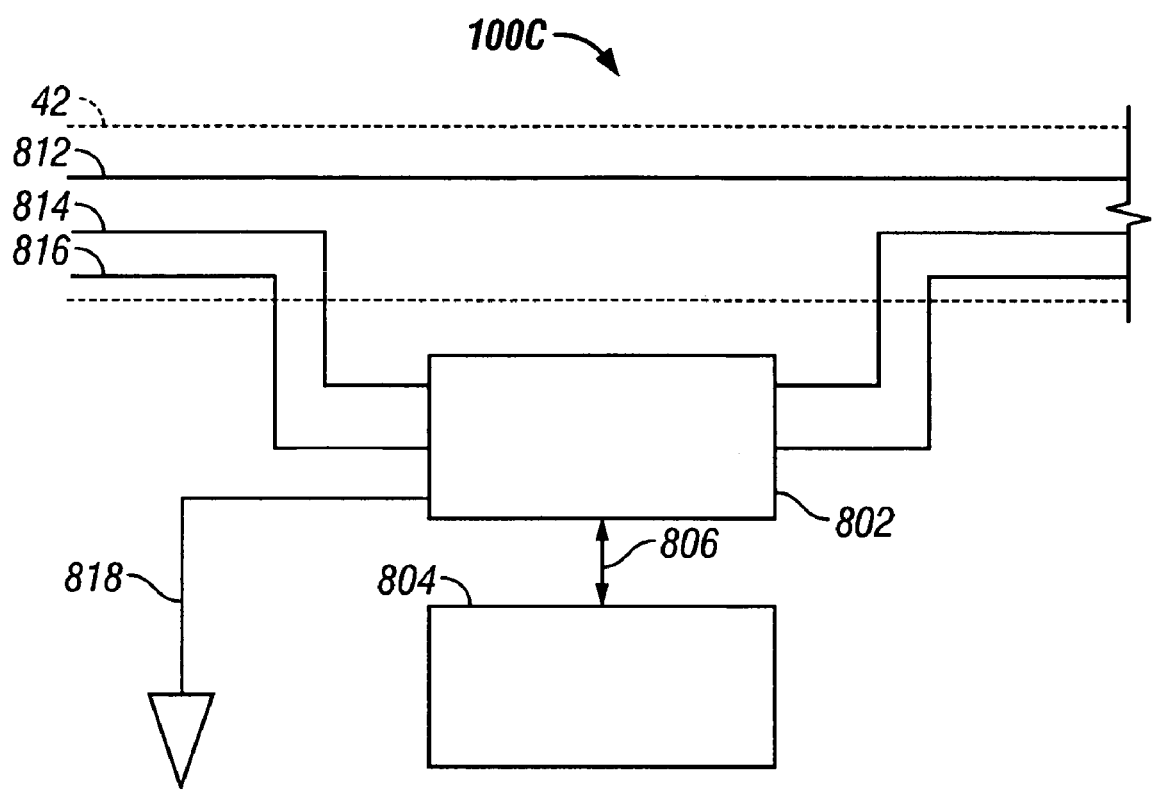
FIG. 8C schematically illustrates another alternate arrangement for deploying a seismic data acquisition unit made in accordance with the present invention onto a continuous portion of a seismic cable wherein the cable to the one or more transducers runs external to the seismic cable.

Referring now to FIG. 8C, there is diagrammatically shown an another alternate embodiment of the present invention wherein a seismic data acquisition unit 100C, also mounted on a continuous portion of a seismic cable 42 (shown in broken lines), includes one or more tension members 812, one or more data transmission lines 814, one or more power transmission lines 816, and one or more transducer lines 818. In the FIG. 8C embodiment, the seismic signal data transmission carrier or line 814 and a power transmission line 816 connect to the connector housing 802. The transducer lines 818, however, are external to the cable 42 and separately connect to the connector housing 802, for example, by take-outs (not shown). A single interface assembly 806 establishes power and/or data transfer between the connector housing 802 and the electric circuitry module 804. The single interface assembly 806 can include an electrical assembly (e.g., plug and receptacle) or other forms of signal transfer (RF, optical, acoustic, electromagnetic, induction). Thus, the single interface assembly 806 can use either a physical signal transmission medium (e.g., copper wire or fiber optical wire) or energy waves. The electric circuitry module 804 can be adapted to perform the same functions as described with respect to the electrical circuitry module of the unit 100A.

Referring now to FIGS. 1 and 2, the data acquisition unit 100 may be advantageously deployed within a seismic survey system wherein one or more transducers, such as geophones, are linked by a plurality of the cables to form a transducer array and, perhaps, sub-arrays. In one mode of deployment, at an off site facility, a cable string is made up with a plurality of cables 42 that are interconnected using the unit 100. This cable string is wound up onto a drum or other storage device and shipped to a survey location. The drum is mounted onto truck or similar vehicle that traverses the ground over the survey location. A mechanized deployment and retrieval system draws the cable string from the drum using rotating tires and lays the cable string on the ground. Thereafter, transducers may be connected as necessary throughout the cable string. Of course, numerous cable strings may be deployed and interconnected for the seismic survey. After completion of the survey, the transducers are disconnected from the cable strings and the mechanized deployment and retrieval system is used to spool up the cable strings. In another mode of deployment, the cable strings may be assembled in the field.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes

What is claimed is:

1. A seismic data acquisition unit, comprising:
   (a) a circuitry module enclosing circuitry for processing seismic signals and for providing communication with at least one external device;
   (b) a connector housing matable with said circuitry module, said connector housing receiving at least two cables adapted to carry seismic signals;
   (c) a first connector coupled to said circuitry; and
   (d) a second connector coupled to said at least two cables, said first connector and said second connector establishing the only communication path between said circuitry and said at least two cables when mated.

2. The seismic data acquisition unit according to claim 1 wherein said connector housing is formed as a unitary member.

3. The seismic data acquisition unit according to claim 1 wherein said connector housing includes a take-out for providing a connection to a transducer, said take-out being coupled to said second connector, whereby a connection is provided between said transducer and said circuitry via said first and second connectors.

4. The seismic data acquisition unit according to claim 1 wherein a seal is provided for one of said circuitry module and said connector housing.

5. The seismic acquisition unit according to claim 1 wherein at least one of said at least two cables has a third connector at an end thereof for connecting said seismic data acquisition unit to one of (a) an additional seismic data acquisition unit and (b) a control unit.

6. The seismic acquisition unit according to claim 1 wherein said communication is by one of (i) electrical signals, (ii) optical signals, (iii) radio waves, and (iv) electromagnetic waves.

7. The seismic acquisition unit according to claim 1 further comprising an anchor adapted to transfer a tensile force applied from a stress member associated with said at least two cables to said connector housing.

8. The seismic data acquisition unit according to claim 1 wherein said circuitry further comprises:
   (i) an analog-to-digital converter to convert seismic signals received from a transducer to digital signals;
   (ii) a two-way telemetry link; and
   a processor to process the digital signals and to transfer the processed signals to the two-way telemetry link.

9. The seismic data acquisition unit according to claim 1 wherein said circuitry further comprises:
   (i) a digital interface adapted to receive digital signals received from a transducer line;
   (ii) a two-way telemetry link; and
   a processor to process the digital signals and to transfer the processed signals to the two-way telemetry link.

10. The seismic data acquisition unit according to claim 1 further comprising a plurality of transducer take-outs, one said take-out being at said connector housing and one said take-out provided for at each said seismic cable.

11. The seismic data acquisition unit according to claim 10, wherein at least one take-out is provided at one of (i) a top surface of said connector housing, and (ii) a side surface of said connector housing.

12. The seismic data acquisition unit according to claim 1 wherein said first and second connector are mated to provide the only connection between said circuitry and all devices external to the seismic data acquisition unit.

13. The seismic data acquisition unit according to claim 1 wherein said connector housing includes a take-out, said take-out connector being in communication with said second connector and a transducer, said take-out being one of (i) disposed in a cavity formed in said connector housing, and (ii) integrally overmolded with said connector housing.

14. The seismic data acquisition unit according to claim 1 wherein said first connector is fixed within said circuitry module and said second connector is fixed within said connector housing.

15. An apparatus for providing a connection between circuitry configured to process seismic data and at least one seismic data carrier, comprising:
   a connector housing adapted to receive the at least one seismic data carrier;
   a plug fixed on said connector housing, said plug being coupled to the at least one seismic data carrier;
   a circuitry module removably mounted on said connector housing;
   a receptacle fixed on said circuitry module, said receptacle being coupled to the circuitry, said receptacle being matable with said plug; and
   a seal disposed in said electrical circuitry module, said seal substantially preventing contaminants from entering said circuitry module interior space regardless of whether said connector housing is mounted on said circuitry module.

16. The apparatus of claim 15 further comprising a seal disposed at a connection between the at least one seismic data carrier and said connector housing, said seal being one of (a) gland seal; and (b) an overmold.

17. The apparatus of claim 15 wherein said connector housing is provided with a seal for providing a substantially contaminant-free environment.

18. The apparatus of claim 15 wherein said connector housing further comprises a take-out; and wherein said plug and said receptacle cooperate to provide a connection between the circuitry and said take-out.

19. The apparatus of claim 15 wherein said connector housing further comprises a support engaging the at least one seismic data carrier, said support adapted to transfer tension from the at least one seismic data carrier into said connector housing without loading said plug and said receptacle.

20. The apparatus of claim 15 wherein said connector housing and said circuitry module have an external configuration when mated, said external configurations allowing said connector housing and said circuitry module to one of (i) lie substantially flat on an arcuate surface of a drum adapted to store seismic cable having the at least one data carrier, and (ii) be manipulated by a mechanized cable deployment and retrieval system.

21. The apparatus of claim 15 wherein said circuitry further comprises:
    (i) an analog-to-digital converter to convert seismic signals received from a transducer to digital signals;
    (ii) a two-way telemetry link; and
a processor to process the digital signals and to transfer the processed signals to the two-way telemetry link.

22. The apparatus of claim 15 wherein said circuitry further comprises:
    (i) a digital interface adapted to receive digital signals received from a transducer line;
    (ii) a two-way telemetry link; and
a processor to process the digital signals and to transfer the processed signals to the two-way telemetry link.

23. A data acquisition unit, comprising:
    a connector housing having a first and second body, each of said bodies including a plug disposed therein, said bodies substantially sealing a portion of their respective plugs;
    an electrical circuitry module configured to mate with said connector housing, said electrical circuitry module including an interior space, two receptacles, and electrical circuitry, said receptacles being complementary to said plugs, said interior space being adapted to receive electrical circuitry, said receptacles being in electrical communication with said electrical circuitry; and
    a seal associated with said electrical circuitry module, said seal substantially preventing contaminants from entering said electrical circuitry module interior space, wherein said seal substantially prevents contaminants from entering said electrical circuitry module interior space regardless of whether said connector housing is mounted on said electrical circuitry module.

24. The data acquisition unit of claim 23 further comprising a lock associated with each connector housing body, said locks adapted to selectively mate said connector housing bodies with said electrical circuitry module.

25. The data acquisition unit of claim 24 wherein each of said locks include a finger having a first state wherein said finger engages said electrical circuitry module and a second state wherein said finger releases said electrical circuitry module, said finger moving between said first and second states when said lock is actuated.

26. The data acquisition unit of claim 23 further comprising a take-out sealingly disposed on said electrical circuitry module, said take-out being in electrical communication with said electrical circuitry.

27. The data acquisition unit of claim 23 wherein said circuitry further comprises:
    (i) an analog-to-digital converter to convert seismic signals received from a transducer to digital signals;
    (ii) a two-way telemetry link; and
a processor to process the digital signals and to transfer the processed signals to the two-way telemetry link.

28. The data acquisition unit of claim 23 wherein said circuitry further comprises:
    (i) a digital interface adapted to receive digital signals received from a transducer line;
    (ii) a two-way telemetry link; and
a processor to process the digital signals and to transfer the processed signals to the two-way telemetry link.

29. A method for establishing a connection between at least two seismic data cables and electrical circuitry, comprising:
    (a) enclosing the electrical circuitry in a circuitry module, the electrical circuitry processing seismic signals and providing communication with at least one external device;
    (b) mating a connector housing with the circuitry module, the connector housing receiving the at least two seismic data cables;
    (c) coupling a first connector to the electrical circuitry; and
    (d) coupling a second connector to the at least two seismic data cables, the first connector and the second connector establishing the only communication path between the circuitry and the at least two seismic data cables when mated.

30. The method of claim 29 further comprising preventing contaminants from contacting one of (i) the electrical circuitry, and (ii) wiring associated with the at least two seismic data cables at the first connector.

31. The method of claim 29 wherein one of the first connector and the second connector uses one of (i) electrical signals, (ii) optical signals, (iii) radio waves, and (iv) electromagnetic waves.

32. The method of claim 29 further comprising coupling a take-out for a transducer to the second connector.

33. The method of claim 29 further comprising transferring a portion of a tractive force applied by the at least one of the at least two seismic data cables to the connector module enclosing at least a portion of the second connector without substantially loading the second connector.

34. The method of claim 29 further comprising:
    (i) converting the analog signals from a transducer to a digital signal with the electric circuitry;
    (iii) processing the digital signals; and
transferring the processed signals to a two-way telemetry link.

35. The method of claim 29 wherein said circuitry further comprises:
    (i) receiving digital signals from a transducer;
processing the digital signals; and
    (ii) transferring the processed signals to a two-way telemetry link.

36. A seismic survey system, comprising:
    (a) a data collection facility for collecting and processing seismic data;
    (b) a plurality of transducers adapted to detect acoustical energy and transmit seismic data signals in response thereto;
    (c) a plurality of seismic data acquisition units, each said seismic data acquisition unit being configured to receive said seismic data signals from a predefined set of said transducers, to process at least a portion of said seismic data signals, and to transmit at least a portion of said seismic signals to one of the data collection facility and an intermediate external device, each said seismic data acquisition unit including:

(i) a circuitry module enclosing circuitry for processing seismic signals and for providing communication with at least one external device;
(ii) a connector housing matable with said circuitry module, said connector housing receiving at least two seismic data carriers adapted to carry seismic signals; and
(iii) a first connector coupled to said circuitry and a second connector coupled to said at least two seismic data carriers, wherein communication between said circuitry and said at least two seismic data carriers is established only via said first and second connectors; and
(d) a seismic data carrier network carrying said seismic data from said predefined set of said transducers to said seismic data acquisition units and from said seismic data acquisition units to said data collection facility.

37. A seismic data acquisition unit of claim 36 wherein said circuitry further comprises:
    (i) an analog-to-digital converter to convert seismic signals received from a transducer to digital signals;
    (ii) a two-way telemetry link; and
    (iii) a processor to process the digital signals and to transfer the processed signals to the two-way telemetry link.

38. A seismic data acquisition unit of claim 36 wherein said circuitry further comprises:
    a digital interface adapted to receive digital signals received from a transducer line;
    a two-way telemetry link; and
    a processor to process the digital signals and to transfer the processed signals to the two-way telemetry link.

* * * * *